United States Patent [19]

Sakamoto et al.

[11] Patent Number: 4,521,724
[45] Date of Patent: Jun. 4, 1985

[54] APPARATUS FOR PROCESSING ENERGY REGENERATED BY AN AC MOTOR

[75] Inventors: Keiji Sakamoto; Yukio Toyozawa, both of Hachioji, Japan

[73] Assignee: Fanuc Ltd., Tokyo, Japan

[21] Appl. No.: 588,870

[22] PCT Filed: May 26, 1983

[86] PCT No.: PCT/JP83/00162
§ 371 Date: Apr. 5, 1984
§ 102(e) Date: Apr. 5, 1984

[87] PCT Pub. No.: WO83/04349
PCT Pub. Date: Dec. 8, 1983

[30] Foreign Application Priority Data

May 26, 1982 [JP] Japan .................................. 57-88006

[51] Int. Cl.³ ............................................. H02P 3/18
[52] U.S. Cl. .................................... 318/762; 318/798; 318/757
[58] Field of Search ....................... 318/762, 807-811, 318/803, 798, 806; 363/37, 41, 437

[56] References Cited

U.S. PATENT DOCUMENTS

4,319,177 3/1982 Kawada et al. .................... 318/762
4,353,023 10/1982 Kawada et al. .................... 318/762
4,434,393 2/1984 Kobari et al. ....................... 318/762

Primary Examiner—David Smith, Jr.
Attorney, Agent, or Firm—Armstrong, Nikaido, Marmelstein & Kubovcik

[57] ABSTRACT

An apparatus for processing the energy regenerated by an AC motor, which comprises a regeneration detection logic circuit (7) that produces a regeneration detection signal when the AC motor driving semiconductor switches are nonconductive and when the direction of the current flowing through the AC motor is opposite to that of the current when the AC motor is driven and a regeneration drive circuit 8 which drives the regenerated energy processing semiconductor switches responsive to the regeneration detection signal. The apparatus renders the regenerated energy processing semiconductor switches conductive so that the regenerated energy is returned to the AC power source only when the AC motor is in a regenerative condition. Therefore, electric power need be consumed in only small amounts by the resistors that protect the semiconductor switches for processing the regenerated energy, and the apparatus can be constructed so that it is small in size.

6 Claims, 5 Drawing Figures

APPARATUS FOR PROCESSING ENERGY REGENERATED BY AN AC MOTOR

DESCRIPTION

1. FIELD OF THE ART

The present invention relates to an apparatus for processing energy regenerated by an AC motor and particularly to an apparatus which returns the energy regenerated by the AC motor to an AC power source.

2. BACKGROUND OF THE ART

The energy regenerated by a motor due to the inertial energy thereof or the energy which the motor receives from an external source usually results in the rise of potential of a DC power source to which is connected a motor drive circuit that receives pulse width modulation (PWM) signals. The rise in potential often destroys a smoothing capacitor which is contained in a rectifier circuit or semiconductor switches are contained in the motor drive circuit to drive the AC motor. It is therefore necessary to process the regenerated energy by some means.

As one means for processing the regenerated energy, a system is known which returns the regenerated energy to an AC power source.

In a conventional apparatus for returning the regenerated energy to the AC power source, hereinafter described in detail, voltages between the phases of the AC power source are monitored during the period of deceleration mode of the AC motor, and semiconductor switches for processing the regenerated energy are closed during periods in which voltages between the phases exceed a predetermined value so as to return the electric current of the DC power source to the AC power source. The regenerated energy can be efficiently returned to the AC power source if it is returned during the periods in which voltages between the phases of the AC power source are great.

In the AC motor, however, three operation modes are performed repetitively, i.e., regeneration, circulation, and consumption, and a regenerative condition is not always established even when voltages between the phases are greater than a predetermined value during the deceleration mode. As was mentioned above, since semiconductor switches for processing the regenerated energy are closed whenever the voltages between the phases become greater than a predetermined value, a large amount of electric power must be dissipated by resistors that are inserted, for protecting the semiconductor switches, between the lines of the DC power source and the semiconductor switches. For this purpose, the resistors must be capable of handling a large amount of electric power. Because of this resistors for handling a large amount of electric power are much greater in size than other elements and make the apparatus for processing the regenerated energy bulky.

DISCLOSURE OF THE INVENTION

IN view of the problems inherent in the above-mentioned conventional apparatus, the object of the present invention, which is based on the idea of detecting the regenerative condition of an AC motor by monitoring the direction of the current flowing through the AC motor and the condition of the motor drive circuit, in addition to monitoring the deceleration mode and the condition in which voltages between the phases are greater than a predetermined value of the AC power source, to provide an apparatus for processing energy regenerated by an AC motor, which apparatus instantaneously discriminates whether or not the AC motor is in a regenerative condition and returns the regenerated energy to the AC power source only under a regenerative condition by rendering conductive the semiconductor switches for processing the regenerated energy, so that the power consumption is decreased in the resistors for protecting the semiconductor switches for processing the regenerated energy, resulting in the possibility of reduced power in the resistors and, accordingly, a reduction in the size of the apparatus for processing the regenerated energy.

To achieve the above-mentioned object, the present invention provides an apparatus for processing energy regenerated by an AC motor, which comprises: a rectifier circuit for supplying a direct current to the lines of the DC power source by rectifying an alternating current supplied from an AC power source; a drive circuit including AC motor driving semiconductor switches connected across the lines of the DC power source, the semiconductor switches being rendered conductive upon the receipt of a PWM signal when the AC motor is to be driven so as to supply the electric current from the lines of the DC power source to each of the phases of the AC motor; a regenerated energy processing circuit connected across the lines of the DC power source, including regenerated energy processing semiconductor switches for returning the energy regenerated by the AC motor to the AC power source, and resistors that protect the semiconductor switches for processing the regenerated energy; current direction detectors for detecting the direction of the current flowing through each of the phases of the AC motor; a regeneration detection logic circuit for producing a regeneration detection signal when the semiconductor switches for driving the AC motor are nonconductive and when the direction of the current detected by the current direction detectors is opposite to the direction of the current when the AC motor is driven; and a regeneration drive circuit for driving the regenerated energy processing semiconductor switches responsive to the regeneration detection signal.

According to the above-mentioned apparatus for processing the regenerated energy of the present invention, the resistors for protecting the regenerated energy processing semiconductor switches may be one for reduced power consumption, and, hence, the size of the apparatus can be reduced.

BRIEF DESCRIPTION OF THE DRAWINGS

The above-mentioned object and features of the present invention will be more apparent when read from the following description of an embodiment of the present invention in conjunction with the accompanying drawings, in which.

BEST MODE FOR PUTTING THE INVENTION INTO PRACTICE

An embodiment of the present invention is described below in conjunction with the drawings.

Figure 1:
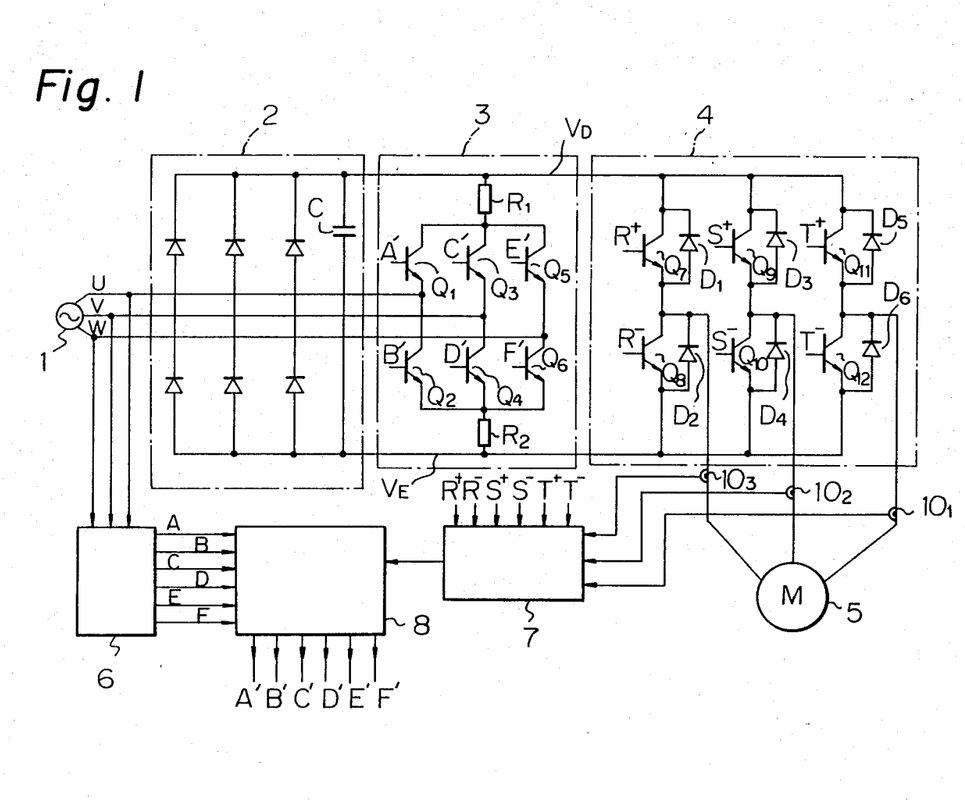
FIG. 1 is a block circuit diagram which schematically illustrates an apparatus for processing the energy regenerated by an AC motor according to an embodiment of the present invention.

FIG. 1 is a block circuit diagram which schematically illustrates an apparatus for processing the energy regenerated by an AC motor according to an embodiment of the present invention. In FIG. 1, reference numeral 1 denotes a three-phase AC power source, 2 denotes a rectifier circuit, 3 denotes a circuit for processing the regenerated energy, 4 denotes a drive circuit for driving a motor responsive to PWM signals, and 5 denotes a three-phase AC motor. The rectifier circuit 2 consists of six diodes and a smoothing capacitor C. The circuit 3 for processing the regenerated energy consists of NPN transistors $Q_1$ to $Q_6$ for processing the regenerated energy and protection resistors $R_1$ and $R_2$ which prevent a heavy current from flowing into the transistors $Q_1$ to $Q_6$. The transistors $Q_1$ and $Q_2$, $Q_3$ and $Q_4$, and $Q_5$ and $Q_6$ are connected in series, respectively. The collectors of the transistors $Q_1$, $Q_3$, and $Q_5$ are connected to a DC power source line $V_D$ via the protection resistor $R_1$. The emitters of the transistors $Q_2$, $Q_4$, and $Q_6$ are connected to a ground line $V_E$ via the protection resistors $R_2$. A drive signal obtained by the present invention is applied to the bases of the transistors $Q_1$ to $Q_6$, whereby the regenerated energy is recovered from the DC power source line $V_D$ into the AC power source 1 through portions of the transistors $Q_1$ to $Q_6$ only when the AC motor 5 is in a regenerative condition.

The drive circuit 4 consists of six NPN transistors $Q_7$ to $Q_{12}$, which receive PWM signals that are obtained by pulse-width modulation of a three-phase alternating current, and diodes $D_1$ to $D_6$, the cathodes of which are connected to the collectors of these transistors and the anodes of which are connected to the emitters of these transistors. PWM signals R+, S+, and T+ are applied to the bases of the transistors $Q_7$, $Q_9$, and $Q_{11}$, respectively. PWM signals R-, S-, and T- are applied to the bases of the transistors $Q_8$, $Q_{10}$, and $Q_{12}$, respectively. Here, the signals R+ and R-, S+ and S-, and T+ and T- are logic signals that assume the level "0" when the other ones assume the level "1". The diodes $D_1$ to $D_6$ permit the passage of a circulating current that flows through the AC motor 5 and a current regenerated by the AC motor 5.

Reference numeral 6 denotes a circuit which detects the phase of the three-phase AC power source 1 and which produces two drive signals among the drive signals A to F when voltages among the phases become greater than a predetermined value in the deceleration mode. In the conventional apparatus, the drive signals A to F produced by the phase detector circuit 6 are applied directly to the bases of the transistors $Q_1$ to $Q_6$ for processing the regenerated energy.

According to the present invention, provision is made for a regeneration detection logic circuit 7 and a regeneration drive circuit 8.

The regeneration detection logic circuit 7 discriminates whether or not the AC motor 5 is in a regenerative condition, relying upon the outputs of current direction detectors $10_1$, $10_2$, and $10_3$ that detect the direction of the current flowing through the AC motor 5 and upon the PWM signals R+, R-, S+, S-, T+, and T- applied to the bases of the transistors in the drive circuit 4. When the AC motor 5 is in a regenerative condition, the regeneration detection logic circuit 7 produces a regeneration detection signal.

The regeneration drive circuit 8 produces drive signals A' to F' to drive the transistors $Q_1$ to $Q_6$ for processing the regenerated energy, responsive to the drive signals A to F produced by the phase detector circuit 6 and the regeneration detection signal produced by the regeneration detection logic circuit 7.

According to the circuit construction of FIG. 1, drive signals are applied to the transistors $Q_1$ to $Q_6$ for processing the regenerated energy only when the AC motor 5 is in a practically regenerative condition. Therefore, electric power is consumed by the resistors $R_1$ and $R_2$ in the regenerated energy processing circuit 3 in amounts considerably smaller than the electric power that must be dissipated by the conventional apparatus.

Figure 2:
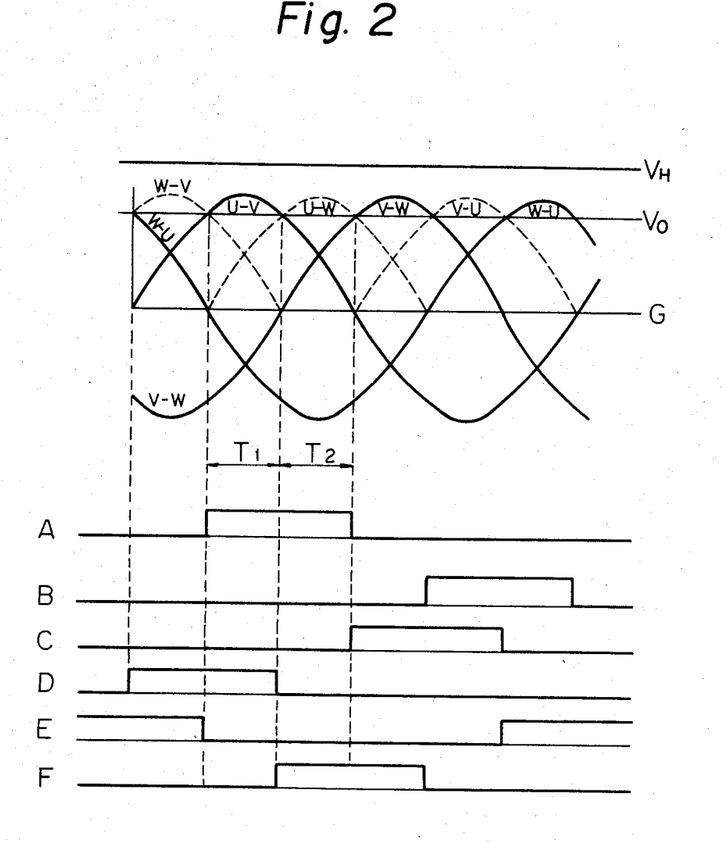
FIG. 2 is a diagram of waveforms illustrating the operation of a phase detector circuit 6 which is shown in FIG. 1.

FIG. 2 is a diagram of waveforms illustrating the operation of the phase detector circuit 6 of FIG. 1. In FIG. 2, the drive signals A and D assume the logic level "1" during a period $T_1$ in which the voltage U-V of the U-phase relative to the V-phase in the three-phase alternating current is greater than a predetermined value $V_0$. In the conventional art, the drive signals A and D are directly applied to the bases of the transistors $Q_1$ and $Q_4$ for processing the regenerated energy, and the current is allowed to flow during the period $T_1$ from the DC power source line $V_D$ to the ground line $V_E$ via the resistor $R_1$, the transistor $Q_1$, the U-phase of the three-phase AC system, the V-phase of the three-phase AC system, the transistor $Q_4$, and the resistor $R_2$ to process the regenerated energy. Likewise, during a period $T_2$ in which the voltage U-W of the U-phase relative to the W-phase becomes greater than $V_0$, the drive signals A and F are rendered to assume the logic level "1", and the regenerated energy is processed via the transistors $Q_1$ and $Q_6$. For another period, similarly, the regenerated energy is processed via two transistors. In FIG. 2, the symbol $V_H$ denotes the potential of the DC power source line $V_D$, and G denotes the potential, 0 volt, of the ground line $V_E$.

As was mentioned previously, the AC motor is not always placed in a regenerative condition in all of the moments during the deceleration mode but generally repeats the three modes, i.e., regeneration, circulation, and consumption. According to the conventional system in which the electric current is allowed to reversely flow from the DC power source line to the AC power source in all of the moments during the deceleration mode as was mentioned in the foregoing, a very large amount of electric power is consumed by the resistors $R_1$ and $R_2$. According to the conventional art, therefore, the resistors $R_1$ and $R_2$ must be capable of handling large amounts of electric power. Since resistors for handling a large amount of power are large in size, the conventional apparatus for processing the regenerated energy requires increased space and is not adapted for being compactly constructed.

The object of the present invention is to solve the problem inherent in the conventional apparatus described above with reference to FIG. 2. Namely, instead of using the outputs A to F produced by the phase detector circuit 6, the apparatus of the invention uses the outputs A' to F' produced by the regeneration drive circuit 8 to drive the transistors $Q_1$ to $Q_6$ for processing the regenerated energy so that the regenerated energy is returned to the AC power source only when the AC motor is in a practically regenerative condition. The embodiment of the invention is described below in further detail in conjunction with FIGS. 3 to 5.

Figure 3:
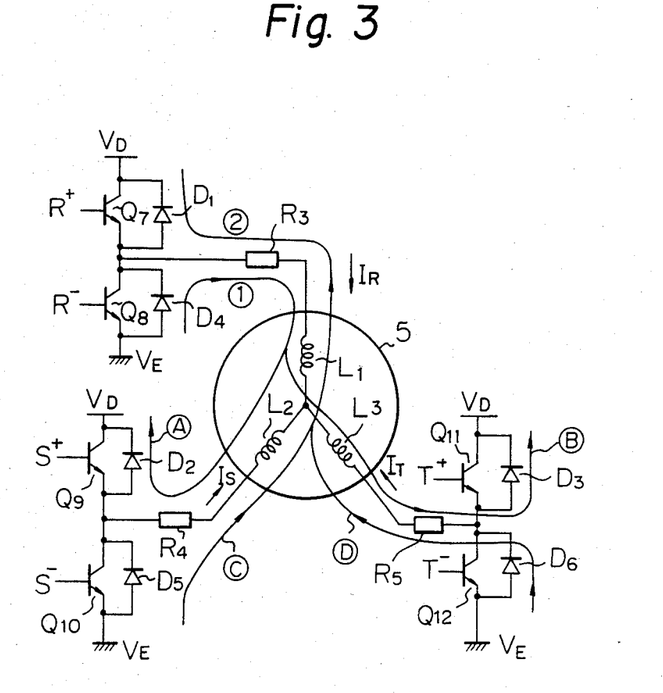
FIG. 3 is a circuit diagram of a PWM drive circuit and an AC motor and explains the principle for discriminating whether or not the AC motor is in a regenerative condition.

FIG. 3 is a circuit diagram of the drive circuit 4 and the AC motor 5 and explains the principle for discriminating whether or not the AC motor is in a regenerative condition. In FIG. 3, inductances $L_1$, $L_2$, and $L_3$ are provided for three phases of the three-phase AC motor 5. The inductances $L_1$, $L_2$, and $L_3$ are connected to each of the phases of the drive circuit 4 via resistors $R_3$, $R_4$, and $R_5$ for detecting current directions. PWM signals R+, S+, and T+ of three phases are applied to the bases of the transistors $Q_7$, $Q_9$, and $Q_{11}$, respectively, and PWM signals R−, S−, and T− are, respectively, applied to the bases of the transistors $Q_8$, $Q_{10}$, and $Q_{12}$. When the resistor $R_3$ for detecting current detects the current in the direction ①, the regenerated current may flow through either a route Ⓐ consisting of a diode $D_4$, the resistor $R_3$, the inductance $L_1$, the inductance $L_2$, the resistor $R_4$, and a diode $D_2$ or a route Ⓑ consisting of the diode $D_4$, the resistor $R_3$, the inductance $L_1$, the inductance $L_3$, the resistor $R_5$, and a diode $D_3$. The regenerated current flowing through route Ⓐ can be detected from the direction ① of the current and the PWM signals R+ and S− that assume the logic level "0". The regenerated current flowing through route Ⓑ can be detected from the direction ① of the current and the PWM signals R+ and T− that assume the logic level "0". Similarly, when the resistor $R_3$ for detecting the current detects the current in the direction ②, the regenerated current may flow through either a route C consisting of a diode $D_5$, the resistor $R_4$, the inductance $L_2$, the resistor $R_3$, and a diode $D_1$ or a route Ⓓ consisting of a diode $D_6$, the resistor $R_5$, the inductance $L_3$, the inductance $L_1$, the resistor $R_3$, and the diode $D_1$. The regenerated current flowing through route Ⓒ can be detected from the direction ② of the current and the PWM signals S+ and R− that assume the logic level "0". The regenerated current flowing through route Ⓓ can be detected from the direction ② of the current and the PWM signals T+ and R− that assume the logical level "0".

Regenerated currents flowing through the resistors $R_4$ and $R_5$ for detecting the directions of currents can also be detected by the same means as the one mentioned above.

In other words, the regenerated current flowing through the R-phase in the direction ② can be detected by the following logical equation (1):

$$\text{Regeneration detection signal } D_R \text{ of } R\text{-phase} = \overline{R^-} \cdot \overline{S^+} \cdot \overline{I_R} \cdot I_S + \overline{R^-} \cdot \overline{T^+} \cdot \overline{I_R} \cdot I_T \quad (1)$$

where $I_R$, $I_S$, and $I_T$, respectively, denote the logic levels of currents that flow from the R-phase, the S-phase, and the T-phase of the PWM drive circuit into the AC motor 5, as is shown in FIG. 3. Referring to the right side of the above equation, the first term indicates that the regeneration detection signal of the R-phase assumes the logic level "1" when R−, S+, and $I_R$ assume the logic level "0" and when $I_S$ assumes the logic level "1", i.e., the regeneration detection signal of the R-phase assumes the logic level "1" when the regenerated current flows through route Ⓒ. The second term indicates that the detection signal of the R-phase assumes the logic level "1" when the regenerated current flows through route Ⓓ.

Similarly, regeneration detection signals of the S-phase and the T-phase can be obtained according to the following logical equations:

$$\text{Regeneration detection signal } D_S \text{ of } S\text{-phase} = \overline{S^-} \cdot \overline{T^+} \cdot \overline{I_S} \cdot I_T + \overline{S^-} \cdot \overline{R^+} \cdot \overline{I_S} \cdot I_R \quad (2)$$

$$\text{Regeneration detection signal } D_T \text{ of } T\text{-phase} = \overline{T^-} \cdot \overline{R^+} \cdot \overline{I_T} \cdot I_R + \overline{T^-} \cdot \overline{S^+} \cdot \overline{I_T} \cdot I_S \quad (3)$$

When any one of the regeneration detection signals assumes the logic level "1", it can be said that the AC motor 5 is in a regenerative condition.

Figure 4:
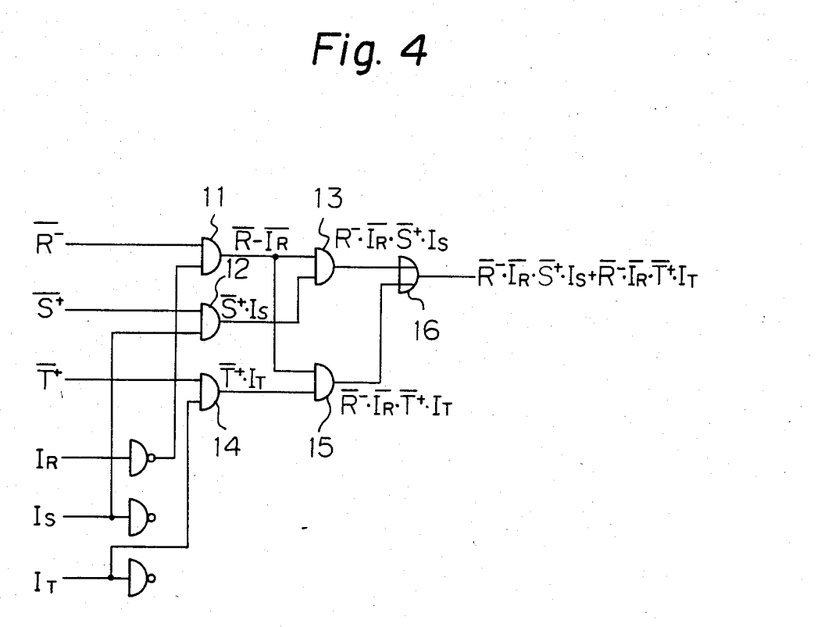
FIG. 4 is a diagram of a logic circuit illustrating a portion of the regeneration detection logic circuit of FIG. 1.

FIG. 4 is a diagram showing the R-phase regeneration detection logic circuit, which is a portion of the regeneration detection logic circuit 7 of FIG. 1. In FIG. 4, an AND gate 11 produces $\overline{R^-}.I_R$, and an AND gate 12 produces $\overline{S^+}.I_S$. An AND gate 13, which receives these output signals, then produces $\overline{R^-}.I_R.\overline{S^+}.I_S$. Similarly, an AND gate 14 produces $\overline{T^+}.I_T$, and an AND gate 15 produces $\overline{R^-}.I_R.\overline{T^+}.I_T$. The outputs of the AND gates 13 and 15 are input to an OR gate 16, which then produces the R-phase regeneration detection signal $D_R$ given by the equation (1).

By providing the same logic circuits as that of FIG. 4 for the S-phase and T-phase, the regeneration signals $D_S$ and $D_T$ of the S-phase and T-phase can also be obtained as given by the equations (2) and (3).

Figure 5:
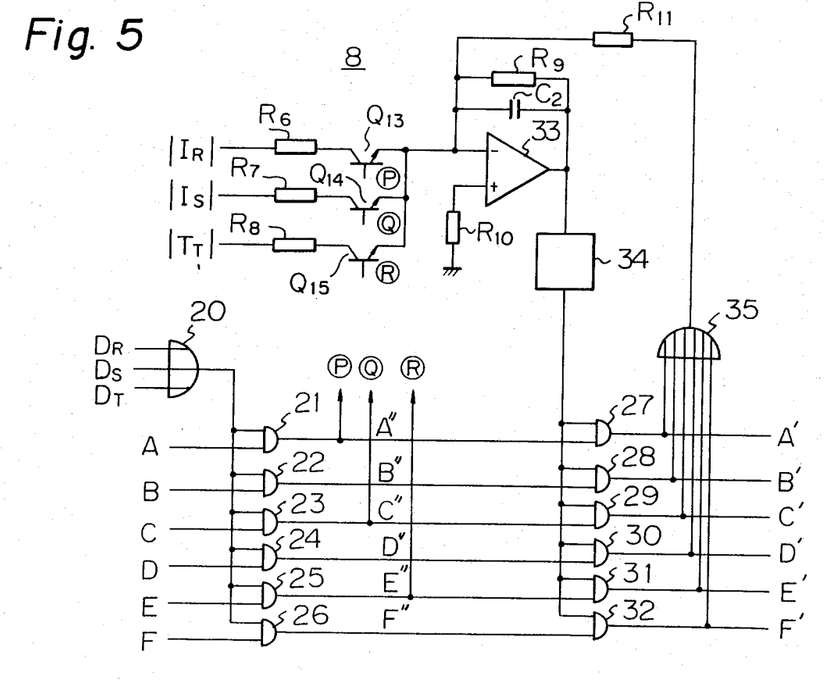
FIG. 5 is a diagram which illustrates in detail a regeneration drive circuit 8 which is shown in FIG. 1.

FIG. 5 is a diagram illustrating in detail the regeneration drive circuit 8 of FIG. 1. In FIG. 5, regeneration detection signals $D_R$, $D_S$, and $D_T$ produced by the regeneration detection logic circuit 7 are input via an OR gate 20 to first input terminals of AND gates 21, 22, - - -, 26. Second input terminals of the AND gates 21, 22, - - -, 26 are served by drive signals A, B, C, - - -, F produced by the phase detector circuit 6 (FIG. 1). Outputs A" to F" produced by the AND gates 21 to 26 which are logical products of the drive signals A to F and the regeneration detection signals of the OR gate 20 serve as drive signals that represent a practical regenerative condition. The object of the present invention can also be accomplished when these signals A" to F" are directly applied to the bases of the transistors $Q_1$ to $Q_6$ for processing the regenerated energy shown in FIG. 1. According to the embodiment shown in FIG. 5, however, the potential rise of the DC power source line $V_D$ caused by the regenerated energy is simulated by using an integration circuit, and drive signals are generated to drive the transistors $Q_1$ and $Q_6$ for processing the regenerated energy for the first time when the potential of the DC power source line $V_D$ is raised by a predetermined voltage by the regenerated energy.

That is, the emitters of NPN transistors $Q_{13}$, $Q_{14}$, and $Q_{15}$ are commonly connected to a negative terminal of an operational amplifier 33, and the collectors of these transistors are served with absolute values of currents of the R-phase, S-phase, and T-phase of the AC motor 5 via resistors $R_6$, $R_7$ and $R_8$. The bases of the transistors $Q_{13}$, $Q_{14}$, and $Q_{15}$ are connected to outputs Ⓟ, Ⓠ, and Ⓡ of the AND gates 21, 23, and 25. In a regenerative condition, as will be understood from the regenerated energy processing circuit 3 of FIG. 1 and the waveforms of FIG. 2, one of the outputs Ⓟ, Ⓠ, and Ⓡ of the AND gates 21, 23, and 25 always assumes the logic level "1". In a regenerative condition, therefore, any one of the transistors $Q_{13}$, $Q_{14}$, and $Q_{15}$ is necessarily rendered conductive, and the regenerated current is supplied to the negative terminal of the operational amplifier 33. An integration circuit is constituted of a capacitor $C_2$ and a resistor $R_9$ connected in parallel with the operational amplifier 33, a bias resistor $R_{10}$ connected between the positive terminal of the operational amplifier 33 and the ground, and the resistor $R_6$, $R_7$, or $R_8$ inserted in each of the phases. Therefore, the operational amplifier 33 produces an integrated value of the regenerated current. The integrated value is input to a comparator circuit 34. As the integrated value reaches a first predetermined value, for example, 10 volts, the output of the comparator circuit 34 is switched from the logic level "0" to the logic level "1". The output of the comparator circuit 34 is input to the first input terminals of AND gates 27 to 32, whose second terminals are served by the outputs of the AND gates 21 to 26. The outputs of the AND gates 27 to 32 serve as drive signals A' to F' which are applied to the bases of the transistors $Q_1$ to $Q_6$ for processing the regenerated energy of FIG. 1. The outputs of the AND gates 27 to 32 are further fed back to the negative terminal of the operational amplifier 33 via an OR gate 35 and a negative feedback resistor $R_{11}$. As the output voltage of the operational amplifier 33 decreases to a second predetermined value, for instance, 3 volts, the output of the comparator circuit 34 assumes the logic level "0" and, hence, the drive signals A' to F' assume the logic level "0". Therefore, the regenerated energy is not returned to the AC power source even though it exists. As the output voltage of the operational amplifier rises again to exceed the first predetermined value, two signals assume the logic level "1" among the signals A" to F" as long as a regenerative condition is established. Therefore, two drive signals assume the logic level "1" among the drive signals A' to F', and the regenerated energy is returned to the AC power source via the regenerated energy processing circuit 3 of FIG. 1. By suitably selecting the ratio of the resistance $R_6$, $R_7$, or $R_8$ constituting the integration circuit to the negative feedback resistance $R_{11}$, the operational amplifier 33 produces an integrated value for simulating the potential rise of the DC power source line $V_D$ caused by the regenerated energy.

According to the circuit constitution shown in FIG. 5, the regenerated energy is not returned to the AC power source at all times whenever a regenerative condition is established but is returned to the AC power source for the first time when the voltage of the DC power source becomes greater than a predetermined value due to the regenerated energy. Therefore, electric power is consumed in reduced amounts by the protection resistors $R_1$ and $R_2$.

The consumption of electric power by the protection resistors $R_1$ and $R_2$ can be greatly reduced even when the signals A" to F" produced by the AND gates 21 to 26 are applied as drive signals to the bases of the transistors $Q_1$ to $Q_6$, as was mentioned earlier, compared with when the transistors $Q_1$ to $Q_6$ are driven by the signals A to F produced by the phase detector circuit 6 as is the case in the conventional art.

In the foregoing was mentioned an embodiment of the apparatus for processing the energy regenerated by the three-phase AC motor. The invention, however, should in no way be limited thereto only but can be adapted to any other AC motor. In this case, it will be easily understood by those skilled in the art that the rectifier circuit, the regenerated energy processing circuit, the regeneration detection logic circuit, and the regeneration drive circuit should be designed to suit the type of AC motor.

According to the present invention as described in the foregoing, the semiconductor switches for processing the regenerated energy are rendered conductive only when a regenerative condition is established to return the regenerated energy to the AC power source. Therefore, electric power is consumed in reduced amounts by the resistors that protect the semiconductor switches for processing the energy regenerated by the AC motor. Accordingly, resistors constructed for handling a small amount of electric power may be employed, and the apparatus for processing the regenerated energy can be constructed so as to have a greatly reduced size.

We claim:
1. An apparatus for processing energy regenerated by an AC motor which comprises:
    a rectifier circuit (2) for supplying a direct current to the lines of a DC power source by rectifying an alternating current supplied from an AC power source;
    a drive circuit (4) including AC motor driving semiconductor switches ($Q_7$ to $Q_{12}$) connected across the lines of said DC power source, said semiconductor switches being rendered conductive upon the receipt of a PWM signal when the AC motor is to be driven so as to supply the electric current from the lines of said DC power source to each of the phases of said AC motor;
    a regenerated energy processing circuit connected across the lines of said DC power source, including regenerated energy processing semiconductor switches ($Q_1$ to $Q_6$) for returning the energy regenerated by said AC motor to said AC power source, and resistors ($R_1$ and $R_2$) for protecting said regenerated energy processing semiconductor switches;
    current direction detectors ($10_1$, $10_2$, and $10_3$) for detecting the direction of the current flowing through each of the phases of said AC motor;
    a regeneration detection logic circuit (7) for producing a regeneration detection signal when said AC motor driving semiconductor switches are nonconductive and when the direction of the current detected by the current direction detectors is opposite to the direction of the current when said AC motor is driven; and
    a regeneration drive circuit (8) for driving said regenerated energy processing semiconductor switches responsive to said regeneration detection signal.

2. An apparatus for processing the regenerated energy as set forth in claim 1, wherein said AC motor has a plurality of phases and said regeneration detection logic circuit (7) is equipped with a plurality of phase regeneration detection logic circuits for detecting the regenerative conditions of each of said plurality of phases.

3. An apparatus for processing the regenerated energy as set forth in claim 2, wherein said AC motor driving semiconductor switches are provided with a plurality of phase driving semiconductor switches for driving a plurality of phases of said AC motor and each of the phase driving semiconductor switches is provided with a transistor for energizing the motor and a transistor for de-energizing the motor.

4. An apparatus for processing the regenerated energy as set forth in claim 3, wherein each of said phase regeneration detection logic circuits receives a PWM signal applied to a transistor for de-energizing said motor that is included in a semiconductor switch for driving the corresponding phase, a PWM signal applied to a transistor for driving said motor that is included in a semiconductor switch for driving phases other than the corresponding phase, and signals that indicate the direction of the current flowing through each of the phases of said AC motor and produces a phase regeneration detection signal that indicates whether or not the corresponding phase is in a regenerative condition.

5. An apparatus for processing the regenerated energy as set forth in claim 4, wherein said regeneration detection logic circuit produces said regeneration detection signal when at least one of said phase regeneration detection signals indicates a regenerative condition in the corresponding phase.

6. An apparatus for processing the regenerated energy as set forth in claim 5, wherein said regeneration drive circuit is provided with an integration circuit which simulates the potential of the line of said DC power source and a comparator which compares the output voltage of said integration circuit with a predetermined value and said regeneration detection signal is applied to said semiconductor switches for processing the regenerated energy when the output voltage of said integration circuit exceeds said predetermined value.

* * * * *